(12) United States Patent
Baek et al.

(10) Patent No.: US 9,857,882 B2
(45) Date of Patent: Jan. 2, 2018

(54) POINTING DISPLAY DEVICE

(71) Applicant: DONGWOO FINE-CHEM CO., LTD., Jeollabuk-do (KR)

(72) Inventors: Sung-Ho Baek, Gyeonggi-do (KR); Ji-Yeon Won, Seoul (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 56 days.

(21) Appl. No.: 14/420,615

(22) PCT Filed: Aug. 22, 2013

(86) PCT No.: PCT/KR2013/007548
§ 371 (c)(1),
(2) Date: Feb. 9, 2015

(87) PCT Pub. No.: WO2014/030943
PCT Pub. Date: Feb. 27, 2014

(65) Prior Publication Data
US 2015/0198745 A1    Jul. 16, 2015

(30) Foreign Application Priority Data

Aug. 22, 2012 (KR) .................. 10-2012-0091942
Jul. 26, 2013 (KR) .................. 10-2013-0088857

(51) Int. Cl.
*G06F 3/03* (2006.01)
*G02B 5/22* (2006.01)
(Continued)

(52) U.S. Cl.
CPC .............. *G06F 3/0304* (2013.01); *C09K 9/02* (2013.01); *G02B 5/223* (2013.01);
(Continued)

(58) Field of Classification Search
CPC ......... G06F 3/0304; G02B 5/223; G02B 5/23; Y10T 428/2848; Y10T 428/31938;
(Continued)

(56) References Cited

U.S. PATENT DOCUMENTS 5,384,077 A * 1/1995 Knowles .............. C07D 405/04
                                                              252/586
2005/0243273 A1* 11/2005 Tanikawa .............. G02B 1/043
                                                             351/159.02

FOREIGN PATENT DOCUMENTS

JP    2006-285231 A    10/2006
JP    2006-331243 A    12/2006
(Continued)

OTHER PUBLICATIONS

English translation for JP 2008-209598, Inventor Sekine Keiko, piblished on Nov. 9, 2008.*
(Continued)

*Primary Examiner* — William Boddie
*Assistant Examiner* — Saifeldin Elnafia
(74) *Attorney, Agent, or Firm* — Baker & Hostetler LLP

(57) ABSTRACT

This invention relates to a pointing display device comprising a UV reaction material layer comprising UV reaction material which generates change of color by UV, UV reaction part comprising a substrate part for which a coating layer is the UV reaction material layer, and UV light source which may emit UV laser.

13 Claims, 1 Drawing Sheet

(51) Int. Cl.
*C09K 9/02* (2006.01)
*G06F 3/0354* (2013.01)
*G02B 1/10* (2015.01)

(52) U.S. Cl.
CPC ............ *G06F 3/03545* (2013.01); *G02B 1/10* (2013.01); *Y10T 428/2848* (2015.01); *Y10T 428/31938* (2015.04); *Y10T 428/31971* (2015.04)

(58) Field of Classification Search
CPC .... Y10T 428/31971; Y10T 428/31975; C09K 11/06; C09K 9/02
USPC ....... 522/74–79, 90–96; 428/423.1, 1.3, 1.31
See application file for complete search history.

(56) References Cited

FOREIGN PATENT DOCUMENTS

| | | |
|---|---|---|
| JP | 2008-209598 A | 9/2008 |
| JP | 2011-150278 A | 8/2011 |
| KR | 10-2004-0014763 A | 2/2004 |
| KR | 10-2008-0027321 A | 3/2008 |
| KR | 10-2009-0005143 A | 1/2009 |
| KR | 10-2009-0124431 A | 12/2009 |
| KR | 10-1097992 B1 | 12/2011 |
| WO | 2012/036084 A1 | 3/2012 |

OTHER PUBLICATIONS

International Search Report dated Dec. 24, 2013, for International Application No. PCT/KR2013/007548.

\* cited by examiner

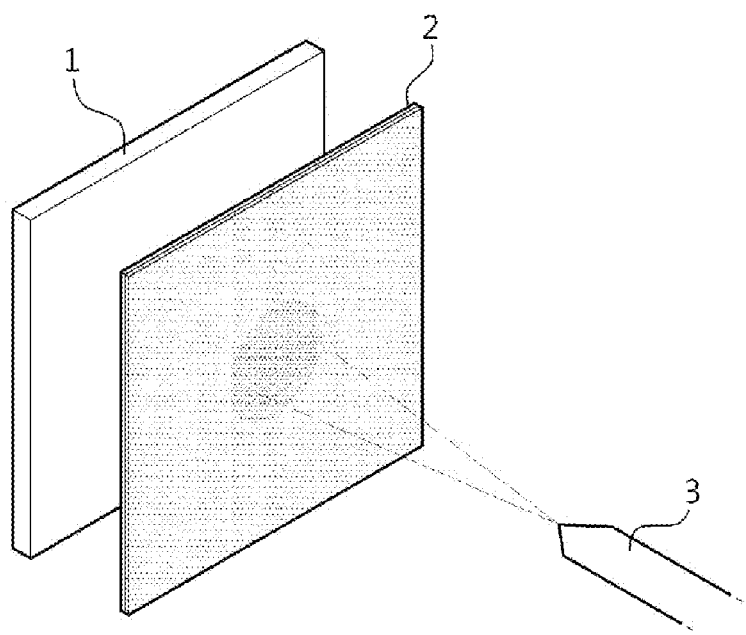

POINTING DISPLAY DEVICE

BACKGROUND OF THE INVENTION

1. Technical Field

The present invention relates to a pointing display device using UV and a UV reaction material, which may applied to a display device.

2. Description of the Related Art

A pointing device, such as a mouse, was used for pointing to the coordinates in a desired display device. A conventional pointing device is a one of computer input methods, and it is a general term for devices by which the pointer on the screen of the computer monitor may be moved, the position of the pointer may be selected, and a selected menu corresponding to it may be entered, such as a mouse used as input means in a graphical user interface (GUI) environment.

A ball mouse widely used in desktop computer and a track ball used in notebook computers may be representative examples of the pointing device. The basic principle of the ball mouse and the track ball are similar together, which is rotating the ball according to user's hand movement by friction with the external object, detecting vertical and horizontal movement of the ball, conversing it into an electric signal, and transmitting it to the computer, and thereby controlling the position of the cursor displayed on the screen.

The Republic of Korea Patent Publication No. 10-2004-0014763 discloses a pointing device using a laser light source, a reflecting plate for reflecting it and camera system, but it was not possible to pointing plurality at the same time and expensive equipment, such as a separate camera for shooting the position of the light source and an image processing program, etc., was required.

To solve this problem, in the present invention provides a pointing display device for which plural simultaneous pointing is possible and the preparation thereof is easy. In general, the photochromic materials have the properties that it changed from colored to colorless or from colorless to colored when an ultraviolet (UV) (sunlight) is irradiated. That is, the photochromic materials exist as dual state of each of absorbing UV and absorbing visible light, and thus make it possible to generate various colors according to the presence of ultraviolet (UV), by occurring reversible reaction which is generating color according to ultraviolet (UV) exposure and converting it into a colorless transparent according to blocking UV.

SUMMARY OF THE INVENTION

Accordingly, the present invention has been made keeping in mind the problems encountered in the related art, and an object of the present invention is to provide a pointing display device, an optical film therefor, and a polarizing plate and a display device comprising the same, which may indicate a pointed location using own emission of photochromic pigment according to UV laser since UV reaction material is coated with the front, and has advantages that the preparation of it is easy and plural pointer may be used.

In order to achieve the above object, the present invention provides an optical film comprising a UV reaction material layer comprising a UV reaction material which generates change of color by UV; and a substrate part for which a coating layer is the UV reaction material layer.

As one embodiment of the present invention, the UV reaction material included in the UV reaction material layer may be one or combinations of two or more selected from spiropyrans compounds, spirooxazines compounds, naphthopyrans compounds, bismethyl phenyl diphenyl butatriene, trinitro fluorenone and the derivatives thereof.

As other embodiment of the present invention, the substrate part may consist of one or combinations of two or more selected from polypropylene, cellulose triacetate, polyacryl resin and polyolefine resin.

As the other embodiment of the present invention, the UV reaction material layer may comprise a UV reaction material and a coating agent.

As the other embodiment of the present invention, the UV reaction material layer may comprise, based on the total weight of the composition, the UV reaction material 1~10% by weight and the coating agent of 90~99% by weight.

As the other embodiment of the present invention, the transmittance of the optical film may be 50~99%.

As the other embodiment of the present invention, the optical film may be colorless transparency or colored transparency.

As the other embodiment of the present invention, the optical film may further comprise an adhesive layer for attaching to screen display device.

In order to achieve the above object, the present invention also provides a pointing display device comprising a UV reaction part including the optical film; and a UV light source which may emit UV laser.

As the other embodiment of the present invention, the UV laser may have wavelength of light of 100 nm to 450 nm and intensity of light of 1 mW/mm$^2$ to 10 mW/mm$^2$.

In order to achieve the above object, the present invention also provides a polarizing plate comprising the optical film.

In order to achieve the above object, the present invention also provides a display device, which comprises the optical film.

The pointing display device of the present invention has a technical feature that a material, in which UV reaction material and coating agent are mixed with specific ratio, is coated on a substrate, and thereby the position pointed by UV may be indicated using that the chemical structure of UV reaction material is changed by UV light source and thereby the color of it is also changed according to the change of spectrum. Further, the present invention has advantages that the preparation of it is easy and plural pointers may be used. Furthermore, UV blocking function is not additionally required for the present invention.

BRIEF DESCRIPTION OF THE DRAWINGS

The above and other objects, features and advantages of the present invention will be more clearly understood from the following detailed description taken in conjunction with the accompanying drawings, in which:

FIG. 1 illustrates a pointing display device according to one embodiment of the present invention. (In the FIG. 1, "1" is a display device, "2" is a UV reaction part (including UV reaction material layer and substrate part), and "3" is a UV light source.

DESCRIPTION OF THE PREFERRED EMBODIMENTS

Hereinafter, a detailed description will be given of the present invention.

The present invention provides an optical film comprising a UV reaction material layer comprising UV reaction material which generates change of color by UV, and a substrate part for which a coating layer is the UV reaction material layer; and a polarizing plate and a display device comprising the optical film.

Further, the present invention provides a pointing display device comprising a UV reaction material layer comprising UV reaction material which generates change of color by UV, UV reaction part comprising a substrate part for which a coating layer is the UV reaction material layer, and UV light source which may emit UV laser.

In the present invention, a "pointing display device" is a device used for pointing and indicating any coordinates on a display device.

The UV reaction material layer reversibly absorbs visible light only on the position incoming from UV light source and the color of the position is changed, and thus it makes it possible to recognize the pointed location coordinate. According to the present invention, if UV light source is irradiated, the color is changed by the change of absorption spectrum resulted from chemical structure. However, if the UV light source is blocked, the color goes back to before-changed color. Further, its color may change from colorless to colored or from colored to colorless by UV.

The UV reaction material layer preferably comprises a UV reaction material and a coating agent. It is preferable that the UV reaction material layer comprises the UV reaction material of 1 to 10% by weight and the coating agent of 90 to 99% by weight based on the total weight of the UV reaction material layer.

The present invention preferably comprises a UV reaction part for which one side or both side of substrate part is coated with UV reaction material layer.

Further, the UV reaction material layer is preferably coated with thickness of 1~10 mm, and more preferably coated with thickness of 4~6 mm which is general surface treatment thickness.

The UV reaction material included in the UV reaction material layer is preferably photochromic pigments used in the related field, and more preferably one or combinations of two or more selected from spiropyrans compounds, spiroox-azines compounds, naphthopyrans compounds, bismethyl phenyl diphenyl butatriene, trinitro fluorenone and the derivatives thereof may be used.

In particular, the spiropyran compound may be, but are not limited to, one or more selected from below compounds:
1',3'-dihydro-1',3',3'-trimethyl-6-nitrospiro[2H-1-benzopy-ran-2,2'-(2H)-indole];
1',3'-dihydro-8-methoxy-1',3',3'-trimethyl-6-nitrospiro[2H-1-benzopyran-2,2'-(2H)-indole];
6,8-dibromo-1',3'-dihydro-1',3',3'-trimethylspiro[2H-1-ben-zopyran-2,2'-(2H)-indole];
6-bromo-1',3'-dihydro-1',3',3'-trimethyl-8-nitrospiro[2H-1-benzopyran-2,2'-(2H)-indole]; and
1',3'-dihydro-5'-methoxy-1',3',3'-trimethyl-6-nitrospiro[2H-1-benzopyran-2,2'-(2H)-indole].

The spirooxazine compound may be, but are not limited to, one or more selected from below compounds:
1,3-dihydro-1,3,3-trimethylspiro[2H-indole-2,3'-[3H] naphth[2,1-b][1,4]oxazine];
5-chloro-1,3-dihydro-1,3,3-trimethylspiro[2H-indole-2,2'-[2H]phenanthro[9,10-b](1,4)oxazine];
5-chloro-1,3-dihydro-1,3,3-trimethylspiro[2H-indole-2,3'-(3H)naphth[2,1-b](1,4)oxazine]; and
1,3-dihydro-1,3,3-trimethylspiro[2H-indole-2,3'-[3H] phenanthr[9,10-b](1,4)oxazine].

Further, the napthopyran compound may be, but are not limited to, one or more selected from below compounds:

3-(2,3-dihydrobenzofuran-5-yl)-3-phenyl-3H-naphtho-[2,1-b]-pyran;
3-(4-methoxyphenyl)-3-(2,4,7-tri-methyldihydrobenzo-furan-5-yl)-3H-naphtho-[2,1-b]-pyran;
3-(2,3-dihydrobenzofuran-5-yl)-3-(2-methoxyphenyl)-3H-naphtho-[2,1-b]-pyran;
8-methoxy-3-(2,3-dihydrobenzofuran-5-yl)-3-(2-fluorophe-nyl)-3H-naphtho-[2,1-b]-pyran;
5-acetoxy-3-(2,3-dihydrobenzofuran-5-yl)-3-(2-fluorophe-nyl)-3H-naphtho-[2,1-b]-pyran; and
3-(2,3-dihydrobenzofuran-5-yl)-3-(2-fluorophenyl)-3H-naphtho-[2,1-b]-pyran.

The UV reaction material of the UV reaction material layer is preferably coated on the front of the substrate part or diffused in the substrate part.

In the UV reaction material layer, the UV reaction material may be included as amount of preferably 1 to 10% by weight and more preferably 2 to 5% by weight. In the below range of 1% by weight the pointing valuable effect by UV light source is not good, and in the above range of 10% by weight the transmittance gets low, and thus conspicuity is not good when attached to display device and using it.

The coating agent of the present invention is a material for forming UV reaction material layer by being mixed with UV reaction material at specific ratio and by being coated on a substrate part. The coating agent may be 90 to 99% by weight based on the total weight of the UV reaction material layer. The above range of the coating agent is preferable in terms of coating property and UV reactivity.

The coating agent may be prepared according to the method used in the related field, and preferably according to below method.

A coating agent may be prepared by mixing 30~50 parts by weight of urethane acrylate, 15~20 parts by weight of pentaerythritol, 30~50 parts by weight of methyl isobutyl ketone, 0.5~10 part by weight of photo initiator, 0.1~10 parts by weight of levelling agent using a stirrer, and filtering using Polypropylene (PP) filter.

For the UV reaction part, colorless transparency or colored transparency materials may be used, and transmittance of the UV reaction part is preferably
50 to 99%, and more preferably 50 to 90%.

Further, the UV reaction material layer is preferably sheet shape, one side or both side of a substrate part is coated with one or combinations of two or more selected from polypropylene, cellulose triacetate, polyacryl resin, polyolefine resin or polyester.

The substrate part preferably comprises one or combinations of two or more selected from polypropylene, cellulose triacetate, polyacryl resin, polyolefine resin or polyester, more preferably comprises one or combinations of two or more selected from polypropylene, cellulose triacetate, polyacryl resin and polyolefine resin.

The UV light source is an energy source for its own emission of UV reaction material. Thus, it is preferable to use a pointing device having a UV light source in order to provide UV reaction material layer with UV laser. Any pointing device may be used as long as it is generally used in the art.

In the present invention, the UV laser preferably has wavelength of light of 100 nm to 450 nm and intensity of light of 1 mW/mm2 to 10 mW/mm2

In the below range of 100 nm of the wavelength of light, it is harmful to the human since it is light source of X-ray area; and in the above range of 450 nm of the wavelength of light, own emission of UV reaction material is not occurred since it is light source of visible light area.

In the below range of 1 mW/mm2 of the intensity of light, visible recognizing of point position is difficult since the own emission of UV reaction material is not good; and in the above range of 10 mW/mm2 of the intensity of light, the problem of inhibiting the performance of the electronic components of the display device may be occurred.

The UV reaction part may further comprise an adhesive layer for attaching to screen display device.

For the display device, any display device may be used as long as generally used, and the selected one from liquid crystal display (LCD), light emitting diodes (LED), organic light emitting diode (OLED) and plasma display (PDP) is preferable.

For the adhesive layer, the one generally used in the field may be used, and optically clear adhesive (OCA) is preferable.

By irradiation of single or plural UV light source to UV reaction material layer attached to display device using the pointing display device of the present invention, the desired positions may be pointed at the same time.

Below is a more detailed description of the present invention through the following examples which are set forth to illustrate, but are not to be construed as limiting the present invention. The scope of the present invention has been shown in the claims, and furthermore, contains meanings equivalent to records of the claims and all variations within the range thereof.

PREPARATION EXAMPLE FOR COATING AGENT

A coating agent was prepared by mixing 40 parts by weight of urethane acrylate (available from Miwon Commercial Co., LTD., SC2153), 18.5 parts by weight of pentaerythritol triacrylate (available from Miwon Commercial Co., LTD., M340), 40 parts by weight of methyl isobutyl ketone (available from Daejung Chemicals & Metals Co.), 1 part by weight of photo initiator (available from Ciba Co., 1-184), 0.5 parts by weight of levelling agent (available from BYK chimie, BYK378) using a stirrer, and filtering using Polypropylene (PP) filter.

EXAMPLES 1 TO 18 AND COMPARATIVE EXAMPLES 1 AND 2

Example 1

UV reaction material layer was prepared by coating a coating solution consisting of 98 parts by weight of the coating agent prepared according to the Preparation Example and 2 parts by weight of spiropyran compound(1',3'-dihydro-1',3',3'-trimethyl-6-nitrospiro[2H-1-benzopyran-2,2'-(2H)-indole]; SigmaAldrich reagent) as a UV reaction material on the one side of a substrate consisting of cellulose triacetate film having 80 mm thickness, and thereafter heating, drying and hardening.

Example 2

A UV reaction material layer was prepared in the same manner as in Example 1, with the exception that the coating solution consists of 97 parts by weight of the coating agent prepared according to the Preparation Example and 3 parts by weight of spiropyran compound (1',3'-dihydro-1',3',3'-trimethyl-6-nitrospiro[2H-1-benzopyran-2,2'-(2H)-indole]) as a UV reaction material.

Example 3

A UV reaction material layer was prepared in the same manner as in Example 1, with the exception that the coating solution consists of 95 parts by weight of the coating agent prepared according to the Preparation Example and 5 parts by weight of spiropyran compound (1',3'-dihydro-1',3',3'-trimethyl-6-nitrospiro[2H-1-benzopyran-2,2'-(2H)-indole]) as a UV reaction material.

Example 4

A UV reaction material layer was prepared in the same manner as in Example 1, with the exception that the coating solution consists of 98.5 parts by weight of the coating agent prepared according to the Preparation Example and 1.5 parts by weight of spiropyran compound (1',3'-dihydro-1',3',3'-trimethyl-6-nitrospiro[2H-1-benzopyran-2,2'-(2H)-indole]) as a UV reaction material.

Example 5

A UV reaction material layer was prepared in the same manner as in Example 1, with the exception that the coating solution consists of 93 parts by weight of the coating agent prepared according to the Preparation Example and 7 parts by weight of spiropyran compound (1',3'-dihydro-1',3',3'-trimethyl-6-nitrospiro[2H-1-benzopyran-2,2'-(2H)-indole]) as a UV reaction material.

Example 6

A UV reaction material layer was prepared in the same manner as in Example 1, with the exception that the coating solution consists of 90 parts by weight of the coating agent prepared according to the Preparation Example and 10 parts by weight of spiropyran compound (1',3'-dihydro-1',3',3'-trimethyl-6-nitrospiro[2H-1-benzopyran-2,2'-(2H)-indole]) as a UV reaction material.

Examples 7~12

A UV reaction material layers were prepared in the same manner as in each of Examples 1 to 6, with the exception that the coating solution consists of spirooxazine compound (1,3-Dihydro-1,3,3-trimethylspiro[2H-indole-2,3'-[3H]nanth[2,1-b](1,4)oxazine]; SigmaAldrich reagent) as a UV reaction material.

Examples 13~18

A UV reaction material layers were prepared in the same manner as in each of Examples 1 to 6, with the exception that the coating solution consists of napthopyran compound (3-(2,3-Dihydrobenzofuran-5-yl)-3-phenyl-3H-naphtho-[2,1-b]pyran; synthesized and used according to the method of U.S. Pat. No. 5,384,077) as a UV reaction material.

Comparative Example 1

A UV reaction material layer was prepared in the same manner as in Example 1, with the exception that the coating solution consists of 89.5 parts by weight of the coating agent prepared according to the Preparation Example and 10.5 parts by weight of spiropyran compound ((6-hydroxy hexyloxy phenyl)carbonyl-spiro-benzopyran) as a UV reaction material.

Comparative Example 2

A UV reaction material layer was prepared in the same manner as in Example 1, with the exception that the coating solution consists of 99.5 parts by weight of the coating agent prepared according to the Preparation Example and 0.5 parts by weight of spiropyran compound ((6-hydroxy hexyloxy phenyl)carbonyl-spiro-benzopyran) as a UV reaction material.

TEST EXAMPLES

The physical properties for the UV reaction material layers prepared according to the above Examples 1 to 18 and Comparative Examples 1 and 2 were evaluated as follow, and the results are stated below Table 1.

(1) Evaluation of Visibility of Point
Whether the position of pointing UV light source by naked eye was evaluated according to below standard.
⊚: very well Visible
○: well Visible
×: not visible (2) Evaluation of Transmittance
The transmittance for Examples 1 to 18 and Comparative Examples 1 and 2 was evaluated using transmittance measuring instrument (Suga HZ-1).

TABLE 1

| | UV laser intensity ($mW/mm^2$) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | C Ex. 1 | C Ex. 2 |
|---|---|---|---|---|---|---|---|---|---|---|---|---|---|---|---|---|---|---|---|---|---|
| point visibility | 0.5 | X | X | X | X | X | X | X | X | X | X | X | X | X | X | X | X | X | X | X | X |
| | 1 | ○ | ○ | ○ | ○ | ○ | ○ | ○ | ○ | ○ | ○ | ○ | ○ | ○ | ○ | ○ | ○ | ○ | ○ | ○ | X |
| | 5 | ⊚ | ⊚ | ⊚ | ○ | ⊚ | ⊚ | ⊚ | ⊚ | ⊚ | ○ | ⊚ | ⊚ | ⊚ | ⊚ | ⊚ | ○ | ⊚ | ⊚ | ⊚ | X |
| | 8 | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ○ |
| transmittance | | 86 | 83 | 80 | 87 | 70 | 60 | 86 | 84 | 81 | 88 | 71 | 60 | 86 | 84 | 80 | 87 | 69 | 61 | 46 | 92 |

As seen in the Table 1, the Examples 1 to 18 have improved point visibility and high transmittance. However, Comparative Example 1 has improved point visibility and low transmittance, and thus conspicuity is not good when attached to display device and using it. Further, Comparative Example 2 has improved transmittance and low point visibility, and thus pointing part is not clear and discrimination is not good.

INDUSTRIAL APPLICABILITY

The pointing display device of the present invention has a technical feature that a material, in which UV reaction material and coating agent are mixed with specific ratio, is coated on a substrate, and thereby the position pointed by UV may be indicated using that the chemical structure of UV reaction material is changed by UV light source and thereby the color of it is also changed according to the change of spectrum. Further, the present invention has advantages that the preparation of it is easy and plural pointers may be used. Furthermore, UV blocking function is not additionally required for the present invention.

What is claimed is:

1. An optical film comprising:
   a UV reaction material layer comprising a UV reaction material which generates change of color by UV; and
   a substrate part for which a coating layer is the UV reaction material layer, wherein the UV reaction material comprises at least one selected from a group consisting of spiropyrans compounds, spirooxazines compounds, naphthopyrans compounds, bismethyl phenyl diphenyl butatriene, trinitro fluorenone and a derivatives thereof;
   wherein a composition of the UV reaction material layer comprises the UV reaction material and a coating agent;
   wherein the composition comprises, based on a total weight of the composition, the UV reaction material 1~10% by weight; and
   the coating agent of 90~99% by weight; and
   wherein the coating agent, is prepared by mixing 30-50 parts by weight of urethane acrylate, 15-20 parts by weight of pentaerythritol, 30-50 parts by weight of methyl isobutyl ketone, 0.5~10 parts by weight of photo initiator, 0.1-10 parts by weight of levelling agent, using a stirrer, and filtering using Polypropylene (PP) filter.

2. The optical film of claim 1, wherein the substrate part comprises at least one selected from a group consisting of polypropylene, cellulose triacetate, polyacryi resin and polyolefine resin.

3. The optical film of claim 1, wherein transmittance of the optical film is 50~99%.

4. The optical film of claim 1, wherein the optical film is colorless transparency or colored transparency.

5. The optical film of claim 1, wherein the optical film further comprises an adhesive layer configured to be attached to a screen display device.

6. A pointing display device comprising:
   a UV reaction part including the optical film of claim 1; and
   a UV light source which emits UV laser.

7. The pointing display device of claim 6, wherein the UV laser has a wavelength of light of 100 nm to 450 nm and an intensity of light of 1 $mW/mm^2$ to 10 $mW/mm^2$.

8. A polarizing plate comprising the optical film of claim 1.

9. A display device, which comprises the optical film of claim 1.

10. The optical of claim 1, wherein the UV reaction material comprises at least two selected from the group consisting of spiropyrans compounds, spirooxazines compounds, naphthopyrans compounds, bismethyl phenyl diphenyl butatriene, trinitro fluorenone and the derivatives thereof.

11. The optical film of claim 1, wherein the substrate part comprises at least two selected from a group consisting of polypropylene, cellulose triacetate, polyacryi resin and polyolefine resin.

12. The optical film of claim 1, wherein the spiropyran compound comprises one or more selected from below compounds:

1',3'-dihydro-1',3',3'-trimethyl-6-nitrospiro[2H-1-benzo-
  pyran-2,2'-(2H)-indole];
1',3'-dihydro-8-methoxy-1',3',3'-trimethyl-6-nitrospiro
  [2H-1-benzopyran-2,2'-(2H)-indole];
6,8-dibromo-1',3'-dihydro-1',3',3'-trimethylspiro[2H-1-
  benzopyran-2,2'-(2H)-indole];
6-bromo-1',3'-dihydro-1',3',3'-trimethyl-8-nitrospiro[2H-
  1-benzopyran-2,2'-(2H)-indole]; and
1',3'-dihydro-5'-methoxy-1',3',3'-trimethyl-6-nitrospiro
  [2H-1-benzopyran-2,2'-(2H)-indole];
wherein the spirooxazine compound comprises one or
  more selected from below compounds:
1,3-dihydro-1,3,3-trimethylspiro[2H-indole-2,3'-[3H]
  naphth[2,1-b][1,4]oxazine];
5-chloro-1,3-dihydro-1,3,3-trimethylspiro[2H-indole-2,
  2'-[2H]phenanthro[9,10-b](1,4)oxazine];
5-chloro-1,3-dihydro-1,3,3-trimethylspiro[2H-indole-2,
  3'-(3H)naphth[2,1-b](1,4)oxazine]; and
1,3-dihydro-1,3,3-trimethylspiro[2H-indole-2,3'-[3H]
  phenanthr[9,10-](1,4)oxazine]; and
wherein the napthopyran compound comprises one or
  more selected from below compounds:
3-(2,3-dihydrobenzofuran-5-yl)-3-phenyl-3H-naphtho-
  [2,1-b]-pyran;
3-(4-methoxyphenyl)-3-(2,4,7-tri-methyldihydrobenzo-
  furan-5-yl)-3H-naphtho-[2,1-b]-pyran;
3-(2,3-dihydrobenzofuran-5-yl)-3-(2-methoxyphenyl)-
  3H-naphtho-[2,1-b]-pyran;
8-methoxy-3-(2,3-dihydrobenzofuran-5-yl)-3-(2-fluoro-
  phenyl)-3H-naphtho-[2,1-b]-pyran;
5-acetoxy-3-(2,3-dihydrobenzofuran-5-yl)-3-(2-fluoro-
  phenyl)-3H-naphtho-[2,1-b]-pyran; and
3-(2,3-dihydrobenzofuran-5-yl)-3-(2-fluorophenyl)-3H-
  naphtho-[2,1-b]-pyran.

13. The optical film of claim 1, wherein the UV reaction material comprises at least one selected from a group consisting of T,3'-dihydro-T, 3',3'-trimethyl-6 nitrospiro[2H-1-benzopyran-2,2'-(2H)-indole], 1,3-dihydro-1,3,3-trimethylspiro[2H indole-2,3'-[3H]naphth[2,1-b][1,4]oxazine] and 3-(2,3-dihydrobenzofuran-5-yl)-3-phenyl-3H-naphtho-[2,1-b]-pyran.

* * * * *